US010963479B1

(12) United States Patent
Shah et al.

(10) Patent No.: US 10,963,479 B1
(45) Date of Patent: Mar. 30, 2021

(54) HOSTING VERSION CONTROLLED EXTRACT, TRANSFORM, LOAD (ETL) CODE (71) Applicant: Amazon Technologies, Inc., Seattle, WA (US)

(72) Inventors: Mehul A. Shah, Saratoga, CA (US); George Steven McPherson, Seattle, WA (US); Supratik Chakraborty, San Jose, CA (US); Anurag Windlass Gupta, Atherton, CA (US); Benjamin Albert Sowell, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 15/385,777

(22) Filed: Dec. 20, 2016

Related U.S. Application Data (60) Provisional application No. 62/426,575, filed on Nov. 27, 2016.

(51) Int. Cl.
*G06F 17/00* (2019.01)
*G06F 16/25* (2019.01)
*G06F 16/21* (2019.01)
*G06F 16/23* (2019.01)

(52) U.S. Cl.
CPC .......... *G06F 16/254* (2019.01); *G06F 16/211* (2019.01); *G06F 16/2365* (2019.01); *G06F 16/258* (2019.01)

(58) Field of Classification Search
CPC ...... G06F 16/13; G06F 16/156; G06F 16/254; G06F 16/283
See application file for complete search history.

(56) References Cited

U.S. PATENT DOCUMENTS

| 8,136,158 | B1 | 3/2012 | Sehr et al. |
|---|---|---|---|
| 8,752,047 | B2 | 6/2014 | Banga et al. |
| 8,819,617 | B1 | 8/2014 | Koenig et al. |
| 9,471,775 | B1 | 10/2016 | Wagner et al. |
| 9,525,673 | B1 | 12/2016 | Belyy |
| 9,684,785 | B2 | 6/2017 | Walsh |

(Continued)

OTHER PUBLICATIONS

Oracle: "Triggers—Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.

(Continued)

*Primary Examiner* — Hung D Le
(74) *Attorney, Agent, or Firm* — Robert C. Kowert; Kowert, Hood, Munyon, Rankin & Goetzel, P.C.

(57) ABSTRACT

Version controlled Extract, Transform, Load (ETL) code may be hosted for developing or executing the ETL job in an ETL system. A version of ETL code may be obtained from version controlled code store and maintained in a data store. Development or execution clients may submit access requests for the version of ETL code which may be serviced from the version stored in the data store. Updates to the version of the ETL code may be eventually committed to the version controlled code store. The latest version of ETL code may also be obtained from the version controlled code store when providing the ETL code in response to a request to retrieve the ETL code.

20 Claims, 8 Drawing Sheets

(56) References Cited

U.S. PATENT DOCUMENTS

| | | | |
|---|---|---|---|
| 2002/0099563 A1* | 7/2002 | Adendorff | G06Q 10/067 705/7.11 |
| 2002/0133368 A1* | 9/2002 | Strutt | G06Q 30/02 705/7.11 |
| 2003/0196193 A1 | 10/2003 | Kuzmin | |
| 2005/0283622 A1 | 12/2005 | Hall et al. | |
| 2007/0179939 A1* | 8/2007 | O'Neil | G06F 16/252 |
| 2007/0203719 A1 | 8/2007 | Kenagy et al. | |
| 2007/0266426 A1 | 11/2007 | Iyengar et al. | |
| 2008/0052534 A1 | 2/2008 | Harada et al. | |
| 2008/0092112 A1* | 4/2008 | Jin | G06F 16/2448 717/106 |
| 2008/0104014 A1 | 5/2008 | Burger et al. | |
| 2009/0177671 A1 | 7/2009 | Pellegrini et al. | |
| 2009/0192979 A1 | 7/2009 | Lunde | |
| 2010/0058291 A1 | 3/2010 | Hahn et al. | |
| 2010/0274750 A1 | 10/2010 | Oltean et al. | |
| 2011/0023028 A1 | 1/2011 | Nandagopal et al. | |
| 2011/0107383 A1 | 5/2011 | Barton et al. | |
| 2011/0154431 A1 | 6/2011 | Walsh | |
| 2012/0042162 A1 | 2/2012 | Anglin et al. | |
| 2012/0054744 A1 | 3/2012 | Singh et al. | |
| 2012/0203877 A1 | 8/2012 | Bartholomay et al. | |
| 2013/0167222 A1 | 6/2013 | Lewis | |
| 2013/0290928 A1 | 10/2013 | Johnson | |
| 2014/0310231 A1* | 10/2014 | Sampathkumaran | G06F 16/254 707/602 |
| 2015/0100542 A1 | 4/2015 | Li et al. | |
| 2015/0113009 A1 | 4/2015 | Zhou et al. | |
| 2015/0254073 A1* | 9/2015 | Menard | G06F 8/71 717/122 |
| 2015/0286701 A1 | 10/2015 | Wideman | |
| 2015/0347541 A1 | 12/2015 | Holmes et al. | |
| 2015/0356293 A1 | 12/2015 | Biswas | |
| 2016/0019132 A1* | 1/2016 | Vilakkumadathil | G06F 11/3612 717/126 |
| 2016/0140032 A1* | 5/2016 | Bender | G06F 11/3692 717/126 |
| 2016/0171229 A1* | 6/2016 | Antic | G06F 16/95 707/602 |
| 2016/0171505 A1* | 6/2016 | Johri | G06F 16/254 705/7.11 |
| 2016/0180084 A1 | 6/2016 | Spurlock et al. | |
| 2016/0224360 A1 | 8/2016 | Wagner et al. | |
| 2016/0224785 A1 | 8/2016 | Wagner et al. | |
| 2016/0259628 A1 | 9/2016 | Schuchman et al. | |
| 2016/0360009 A1 | 12/2016 | Borley et al. | |
| 2017/0060968 A1* | 3/2017 | Dhayapule | G06F 11/368 |
| 2017/0060969 A1* | 3/2017 | Dhayapule | G06F 16/254 |
| 2017/0126795 A1 | 5/2017 | Kumar et al. | |
| 2017/0213037 A1 | 6/2017 | Toledano et al. | |
| 2017/0220654 A1* | 8/2017 | De | G06F 16/86 |
| 2018/0129497 A1 | 5/2018 | Biddle et al. | |
| 2018/0157703 A1 | 6/2018 | Wang et al. | |
| 2018/0157842 A1 | 6/2018 | Holz et al. | |
| 2018/0189350 A1 | 7/2018 | Imaki | |
| 2018/0189510 A1 | 7/2018 | Seko | |
| 2018/0276781 A1 | 9/2018 | Oliveria et al. | |

OTHER PUBLICATIONS

Bratko, A. et al., "Exploiting Structural Information for semi-structured document categorization", Information Processing & Management, Dated May 1, 2006, vol. 42, No. 3, pp. 679-694.

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

U.S. Appl. No. 15/385,764, filed Dec. 20, 2016, Mehual A. Shah et al.

U.S. Appl. No. 15/385,772, filed Dec. 20, 2016, Mehul A. Shah et al.

U.S. Appl. No. 15/385,787, filed Dec. 20, 2016, George Steven McPherson et al.

U.S. Appl. No. 15/385,784, filed Dec. 20, 2016, George Steven McPherson et al.

U.S. Appl. No. 15/385,789, filed Dec. 20, 2016, George Steven McPherson et al.

* cited by examiner

HOSTING VERSION CONTROLLED EXTRACT, TRANSFORM, LOAD (ETL) CODE

RELATED APPLICATIONS

This application claims benefit of priority to U.S. Provisional Application Ser. No. 62/426,575, entitled "Hosting Version Controlled Extract, Transform, Load (ETL) Code," filed Nov. 27, 2016, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data formats that offer different processing or maintenance capabilities. However, introducing multiple data formats is not without cost. Data is often processed by different systems which may not support the current data format of the data. Thus, the ability to perform techniques that extract, transform, and load data between different formats or locations is desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of hosting version controlled Extract, Transform, Load (ETL) code are described herein. ETL processing provides data administrators, stake holders, producers, or consumers with the ability to take advantage of different data formats, storage systems, or storage locations by facilitating the movement data across different data stores and data schemas or formats. For example, data producers that collect usage and other analytics for web site interactions (e.g., visitor clicks and other actions), may generate stored analytics data in large log files or other semi-structured data formats. However, in order to perform various analytical operations or queries over the analytics data, an ETL process may need to be performed to extract desired data, transform the desired data into a format usable by an analytics engine, like a database system, and load the extracted data into the appropriate storage system in the appropriate data schema and format.

Developing code to execute an ETL process may involve collaboration from multiple parties and testing in ETL execution environments. Different versions of ETL code may be developed, some of which may never be deployed and some of which may be distributed or made available for wide use. In order to ensure that the changes to ETL code are tracked and deployed correctly, version control techniques may be implemented to control the ways in which ETL code is changed and deployed. Typically version control systems are implemented separately from the execution platforms in which the controlled code is executed. Such separation makes deployment or testing of code cumbersome in environment like ETL processing. However, hosting version controlled ETL code as part of an ETL execution environment may reduce the time and steps necessary to test or deploy ETL code, without sacrificing the safety provided by controlling changes to the ETL code.

Figure 1A:
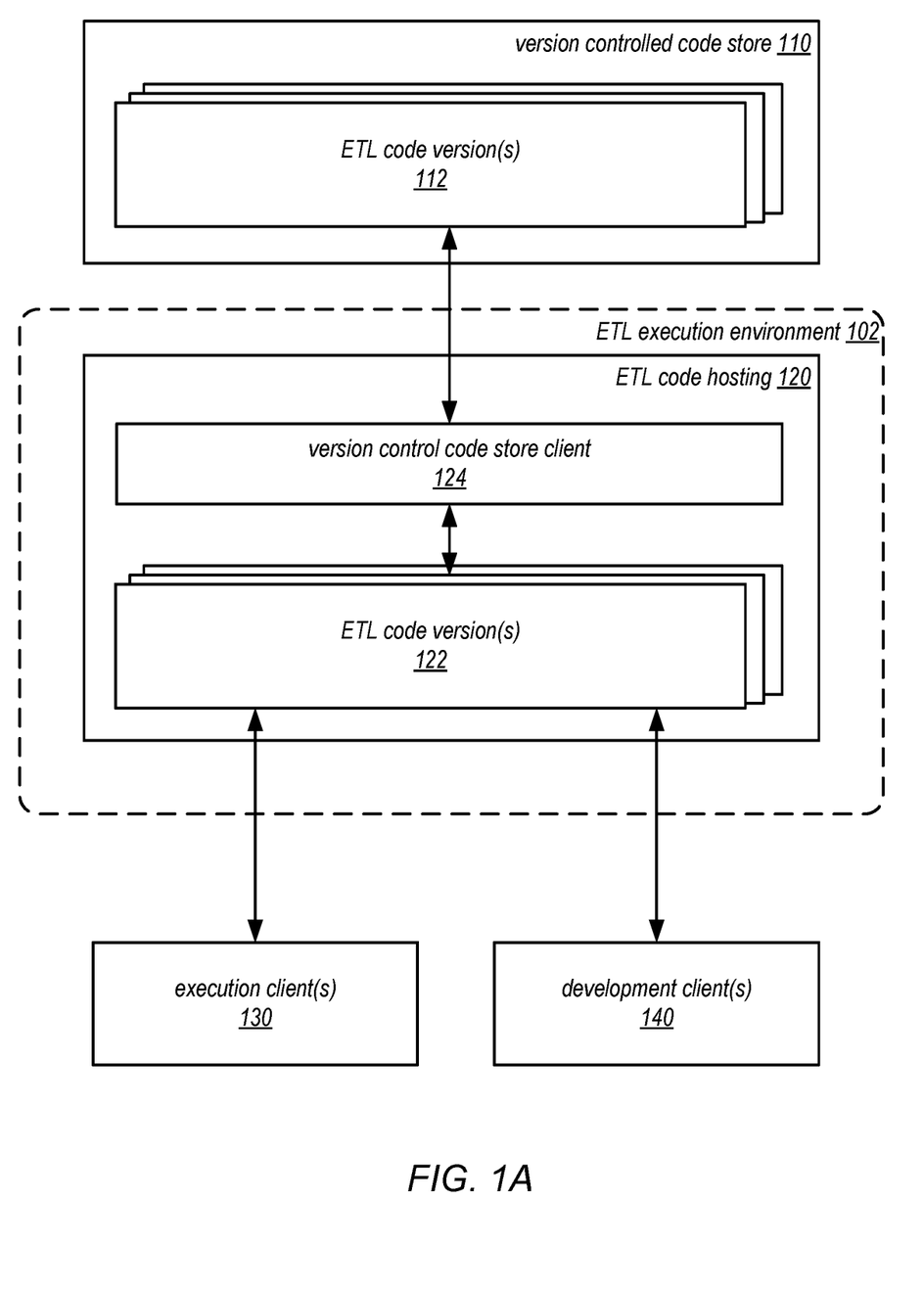
FIG. 1A illustrates a logical block diagram of hosting version controlled extract, transform, load (ETL) code, according to some embodiments.

FIG. 1A illustrates a logical block diagram of hosting version controlled extract, transform, load (ETL) code, according to some embodiments. Version controlled code store 110 may be a data store implementing version control techniques or mechanisms to track and control changes to code stored at version control code store 110. For example, version controlled code store 110 may implement graph structures (e.g., Git directories) to track revisions performed with respect to code files, snippets, scripts, or other code stored at controlled data store in order to provide concurrent editing or access to code, version merging for combining changes to code, and maintaining the identity of snapshots or baseline versions of the code from which different versions depend.

As illustrated in FIG. 1A, version controlled code store 110 may store ETL code version(s) 112. For example, ETL code version(s) 112 may be the entire code of an ETL job (e.g., one or more transformations and/or operations to execute an ETL process) or code for performing an operation or transformation implemented as part of an ETL process (e.g., aggregating data, modifying data, deleting data, changing data types, etc.). Execution client(s) 130 and development client(s) 140 may utilize ETL code maintained in version controlled code store 110 in order to develop and execute ETL processes. Instead of directly interacting the version controlled code store 110, placing the burden of upload and updating ETL code into an ETL execution environment, such as ETL execution environment 102, ETL code hosting 120 may be implemented as part of ETL execution environment in order to directly integrate external version controlled code store 110 with ETL execution environment 102.

For example, instead of requiring execution client(s) 130 or development client(s) 140 to interact with both version controlled code store 110, ETL code hosting 120 may be implemented to host ETL code version(s) 122 as part of execution environment 102. Requests to access ETL code versions may be directed to ETL code hosting 120. ETL code version(s) 122 may still be maintained in ETL code hosting 120 according to the tracking and version controls implemented by version controlled code store 110, as version controlled code store 110 may still be the authority for versions of ETL code. ETL code hosting 120 may implement a version control code store client 124 that interacts with version controlled code store 110 to update ETL code version(s) 112 or retrieve ETL code version(s) 112 from version controlled code store 110. As version controlled code store 11 may treat ETL code hosting 120 as it would any client, the version controls for accessing ETL cover version(s) 112 in version controlled code store may remain in place. For example, in order to gain access to a repository of ETL code versions in version controlled code store 110, development client(s) 140 may submit a request to ETL code hosting 120, which may obtain the repository from version controlled code store 110 via version control code store client 124. Version control code store client 124 may provide access to different types of version controlled code stores 110, so that execution client(s) 130 or development client(s) 140 may utilize code stored in different code stores, using the same interface with ETL code hosting 120.

Figure 1B:
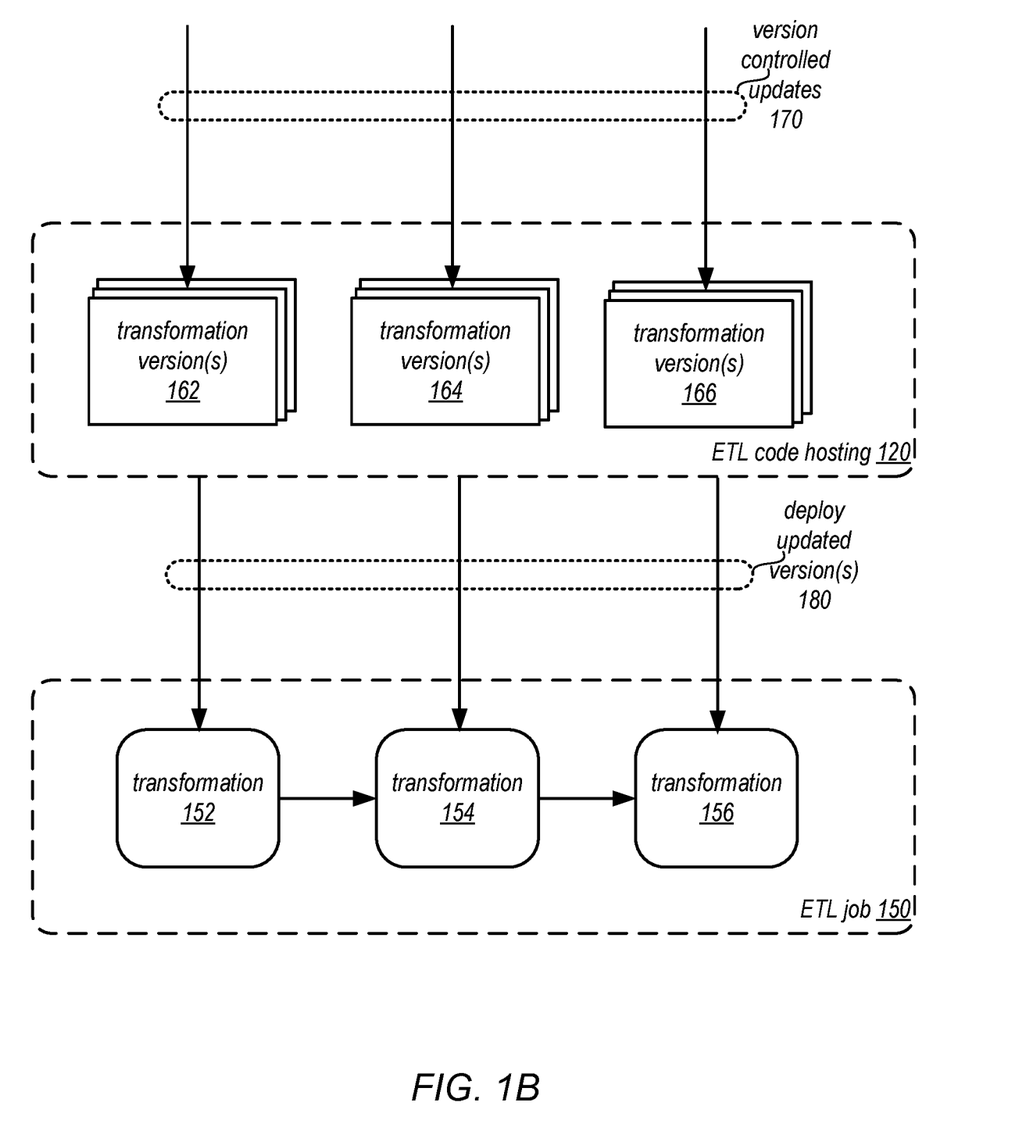
FIG. 1B illustrates a logical block diagram of an ETL job that includes different versions of hosted of ETL code, according to some embodiments.

As ETL code hosting 120 is implemented as part of execution environment 102, changes to ETL code version(s) 112 may be automatically deployed when executing ETL jobs that utilize the latest version of ETL code, in some embodiments. Moreover, when an ETL job includes different code (e.g., different scripts) to execute different transformations or operations, deployment of the latest ETL code versions for individual transformation(s) or operations may be performed. For example, FIG. 1B illustrates a logical block diagram of an ETL job that includes different versions of hosted of ETL code, according to some embodiments. ETL job 150 may include transformations 152, 154, and 156 to execute ETL job. ETL code hosting 120 may maintain versions of the transformations (e.g., transformation versions 162, 164, and 166 respectively). As ETL code hosting 120 may be able to obtain version controlled update(s) 170 to the different transformation version(s), these updates may be deployed when ETL job 150 is executed, instead of requiring developers or execution clients to update individual transformations in ETL job 150. In this way, development of improvements to individual transformations may be encouraged, as ETL job 150 may be updated on a per transformation or operation basis, rather than requiring updates to the entirety of ETL job 150.

Please note that the previous description of hosting version controlled ETL code is a logical illustration and thus is not to be construed as limiting as to the architecture for implementing a data store, ETL execution environment, ETL execution clients, ETL development clients, a version controlled code store, or an ETL job.

This specification begins with a general description of a provider network that implements an extract, transform, load (ETL) service that identifies, transforms, and moves data stored in the provider network or in external data stores. Then various examples of the ETL service including different components/modules, or arrangements of components/module that may be employed as part of implementing the ETL service are discussed. A number of different methods and techniques to implement hosting version controlled ETL code are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
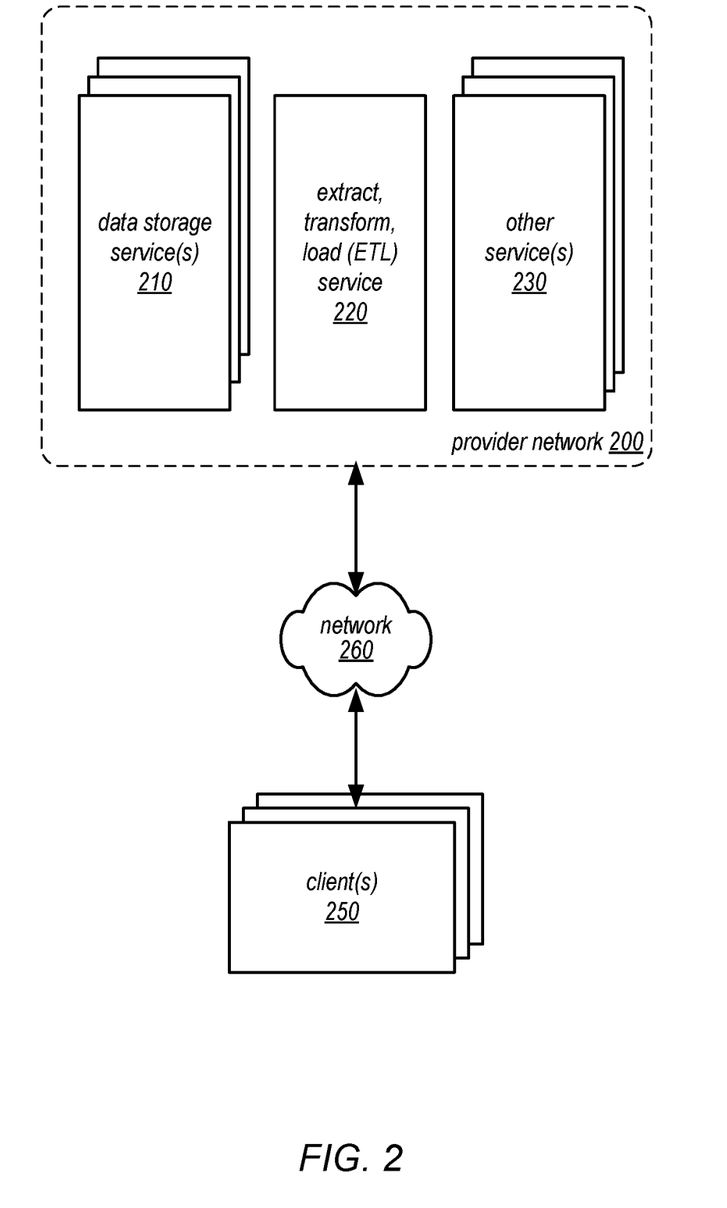
FIG. 2 is a block diagram illustrating a provider network offering different services including an extract, transform, load (ETL) service that implements hosting version controlled ETL code, according to some embodiments.

FIG. 2 is a block diagram illustrating a provider network offering different services including an extract, transform, load (ETL) service that implements hosting version controlled ETL code, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, the ETL service may provide clients with the resources to create, maintain, and orchestrate data loading jobs that take one or more data sets, perform various transformation operations, and store the transformed data for further processing (e.g., by one or more of data processing service(s)). The ETL service may access a data catalog generated by ETL service 220 in order to perform an ETL operation (e.g., a job to convert a data object from one file type into one or more other data objects of a different file type).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210. Other service(s) 230 may include a version controlled code storage service (which may be accessed according to the techniques discussed below).

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, a request to retrieve, update, or otherwise obtain a version of ETL code, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
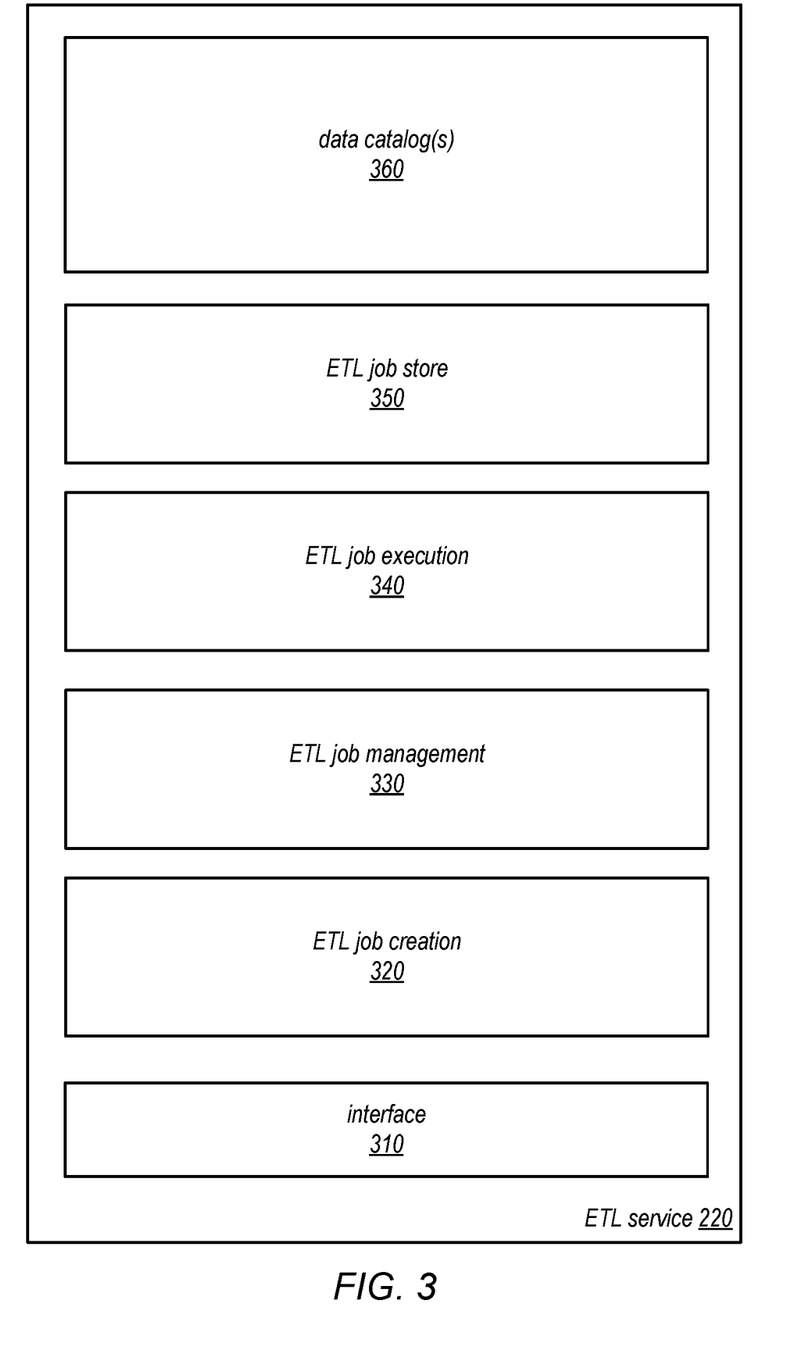
FIG. 3 is a block diagram illustrating an ETL service that implements hosting version controlled ETL code, according to some embodiments.

FIG. 3 is a block diagram illustrating an ETL service that implements hosting version controlled ETL code, according to some embodiments. ETL service 220 may provide access to data catalogs 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation. ETL job creation 20 may handle requests for automated ETL job creation and manual ETL job creation. For example, ETL job creation 320 may receive job generation request which may specify the data object and target data format for the ETL job. Other job information, such as access credentials, triggering events, or any other information to execute the ETL job may be included as part of the creation request or as part of a trigger event registration request. ETL job creation 320 may automatically generate ETL code to perform an ETL job by determining the source data format of the data object and the target data format of the data object. For example, in one embodiment, the source and target data formats from data catalog 360. In another embodiment, data format identification may perform data format recognition techniques, or access other data stores (e.g., such as a data catalog stored in relational database) to retrieve the data format information. ETL job creation 320 may then compare the source data format and target data format or schema to select transformations to apply to the source data object to achieve the target data format. ETL job creation 320 may then generate code for selected transformations and construct the source code for executing the selected transformations. The code for the ETL job may be stored in ETL job store 350 for subsequent execution. ETL code may also be obtained, updated, or otherwise managed using an external version controlled code store and a version of the ETL code that is hosted in ETL job store 350, as discussed below with regard to FIGS. 4 and 5.

ETL job creation 320 may also implement manual creation of ETL jobs. For example, transformation operations may be manually selected, combined, or assembled via graphical user interface to define a workflow of transformations to apply. Code corresponding to the workflow may be generated (or supplied by a user), edited, and stored for subsequent execution as part of ETL job store 350. ETL service 220 may implement ETL job management 330 to provide clients with the ability to manage, edit, delete, or otherwise change ETL jobs. Trigger events, may also be defined for ETL jobs. ETL job management 330 may monitor for trigger events and request execution of ETL jobs. ETL service 220 may implement ETL job execution 340 to provide an execution platform ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from ETL job creation 320. In some embodiments, ETL job execution 340 may execute automatically generated ETL jobs that were modified (as discussed below with regard to FIGS. 5 and 6). ETL job execution 340 may execute jobs in response to detected triggering events for ETL jobs (which may be detected by ETL job management or another system or service monitoring for triggering event conditions).

ETL service 220 may maintain data catalogs 360 that describe data sets (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) 360 (e.g., requests to combine, delete, or split tables of metadata in the catalog or edit the metadata determined for a data catalog. ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Figure 4:
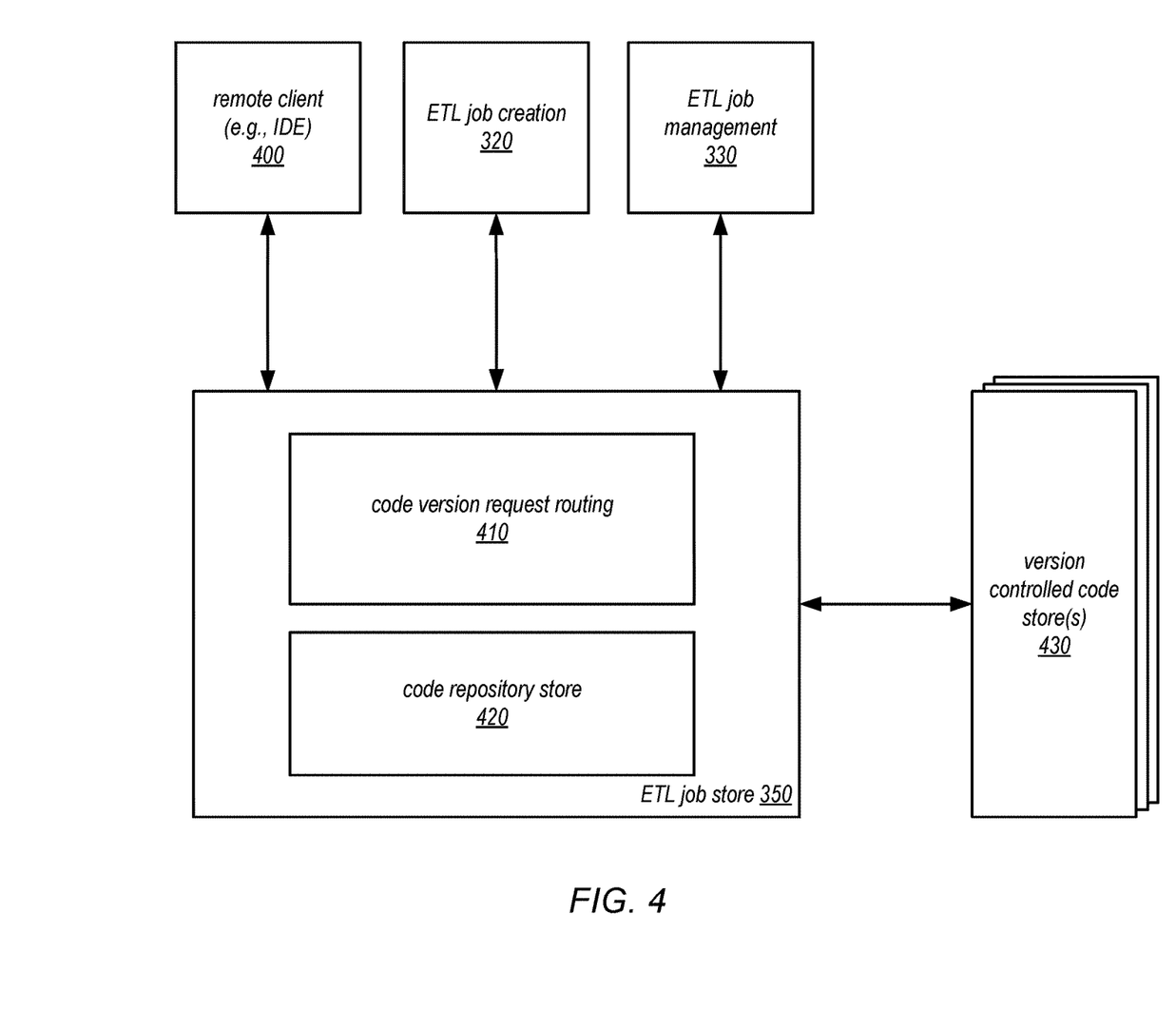
FIG. 4 is a logical block diagram illustrating an ETL job data store that hosts version controlled ETL code, according to some embodiments.

Storage for data catalog(s) 360 may be implemented by one or more storage nodes, services, or computing devices (e.g., system 1000 discussed below with regard to FIG. 7) to provide persistent storage for data catalogs generated by data catalog service 200. Such storage nodes (or other storage components of storage 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, a collections of metadata for various data objects stored across different storage service(s) 210 on behalf a single user account may be stored together in a single catalog of metadata for user data objects that may be made accessible to clients FIG. 4 is a logical block diagram illustrating an ETL job data store that hosts version controlled ETL code, according to some embodiments. ETL job store 350 may provide access to ETL code for executing ETL jobs as part of ETL service 220 and for developers, users, or other entities that desire to maintain ETL code in a version controlled environment. ETL job store 350 may implement a request handling layer, code version request routing 410, and storage layer, code repository store 420. Code repository store 420 may be a multi-tenant store, physically storing data at a same physical storage system or device while enforcing logical isolation so that unauthorized access to ETL code is prevented. The layers of ETL job store 350 may be implemented in different ways.

For example, in one embodiment, network-based data values may be implemented to store ETL code on behalf of clients as part of different code repositories. A fleet of compute nodes or storage nodes may be implemented as part of code repository store to manage the different data volumes storing code repositories. The storage nodes may be repositories according to a distribution scheme. For example, a consistent hash function may be implemented to hash an account id and/or repository name or location in order to determine a hash value. Each storage node may be responsible for a different range of hash values so that the determined hash value is used to locate the storage node responsible for a particular account's repository. In a different embodiment, code repository store 420 may be implemented as a file system (e.g., as part of a file system service), so that each code repository may be treated as a separate file system.

Request routing 410 may be implemented as a fleet of computing nodes that process received requests, such as the requests discussed below with regard to FIG. 5. Requests may be dispatched by request routing 410 to the appropriate storage node (e.g., based on the account and repository being accessed according to the distribution scheme) or file system. In those embodiments utilizing storage nodes, the storage node may then access the data value and code repository to perform the appropriate actions to service the request (e.g., get or update ETL code). The storage node may also send requests to the version controlled code store(s) 430 in which the ETL code is maintained to commit or retrieve a later version of the ETL code. In those embodiments implementing a file system for code repositories, the request handling node may send requests to requests to the version controlled code store(s) 430 in which the ETL code is maintained.

Various different clients, components, systems, or services may interact with ETL job store 350. For example, remote clients, such as remote client 400 may interact with the ETL job store to retrieve, update, or manage ETL code or code repositories of ETL code. For example, a remote client may be an integrated development environment (IDE) executing on a personal computer system (e.g., laptop) which may interact with ETL job store 350 according to an API (e.g., as discussed below with regard to FIG. 5) to retrieve ETL code for editing and commit the ETL code back into ETL job store 350 for subsequent execution. In this way, preferred development environments can be used to modify ETL code without relying upon a textual editor or other interface provided by ETL service 220. Moreover, because ETL job store 350 is hosting the ETL code, a failure of remote client 400 may not "lose" changes submitted to ETL job store 350. ETL job creation 320 is another client that may access ETL job store 350. For example, ETL job creation may perform automatic code generation for ETL jobs and may access ETL code in ETL job store 350 to generate an ETL job or to store the automatically generated ETL code. ETL job creation 320 may also store user created or edited ETL code submitted through a graphical or user interface implemented as part of ETL job creation 320 for manual ETL job creation.

ETL job management 330 may access ETL job store 350 to obtain ETL job code for execution. For example, a trigger event for an ETL job may be detected by ETL job management 330, which may obtain the ETL code for executing the ETL job 330 from ETL job store 350. Because changes to ETL job code may be propagated according to the version control techniques offered by version controlled code store(s) 430, updates to ETL code may be included in the ETL code sent to ETL job management when executing requests. In this way, developers can ensure that the latest changes made to ETL job code are included in the execution of an ETL job by ETL service 220.

Figure 5:
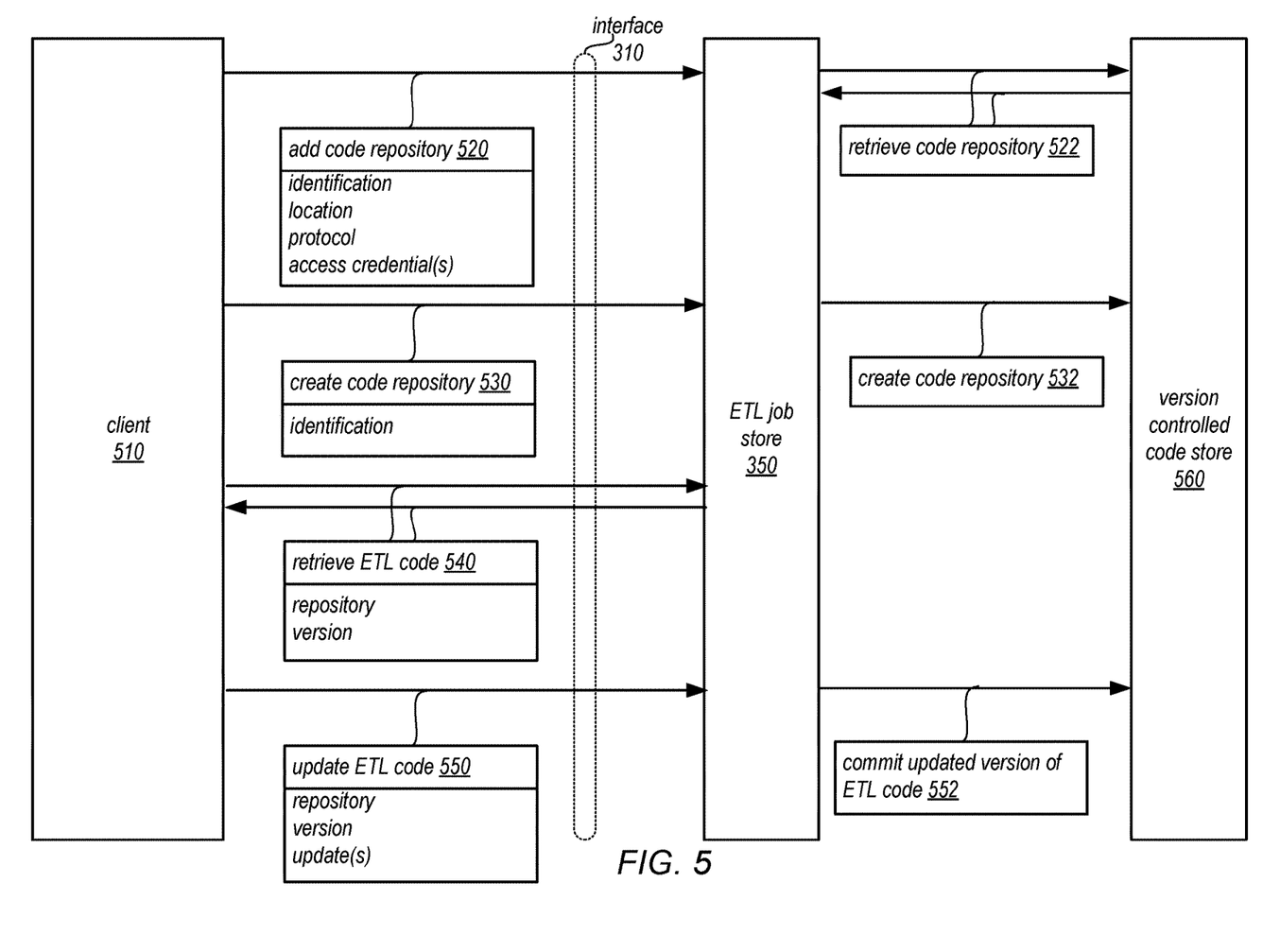
FIG. 5 is a logical block diagram illustrating interactions among a client, ETL job store, and version controlled code store, according to some embodiments.

FIG. 5 is a logical block diagram illustrating interactions among a client, ETL job store, and version controlled code store, according to some embodiments. As noted above, interface 310 may be a network-based, graphical, and/or programmatic interface (e.g., API), that allows clients, such as client 510 (which may be similar to clients 250 discussed above with regard to FIG. 2), access to ETL service 220. Client 510 may submit a request to add a code repository 520 via interface 310 to ETL job store 350, in some embodiments. The request 520 may include the identification of the code repository (e.g., name or other identifier, description, such as a tag, label, or other information describing the code repository). The add repository request 520 may include an identification of the protocol for accessing the version controlled code store 560. For example, the protocol for a Git repository may be indicated. A location of the repository may be included. For instance, a Uniform Resource Locator (URL) or network address may be included to identify the location of the repository. Access credential(s), such as a name and password, token, or other identifier, may be included in add code repository request 520. In response to receiving the request, ETL job store 350 may send a request to retrieve the code repository 522 to version controlled code store 560 according to the information included in the add code repository request. For example, the specified protocol may be used to format requests to retrieve the code repository 522.

Client 510 may send other repository management requests. For example, client 510 may send a request to create a new code repository 530. The new code repository may include information to identify the code repository for subsequent access, such as name or other identifier which may indicate the contents of the new code repository. ETL job store 350 may create a local code repository according to the request and then send a request 532 to version controlled code store 560 to create the corresponding code repository in version controlled code store 560. Another repository management request, not illustrated, may be a request to retrieve a list of repositories associated with a user account that are maintained in ETL job store 350.

Client 510 may send a request to retrieve ETL code 540 from ETL job store 350. The request to retrieve the ETL code may include an identifier indicating the repository from which the ETL code is to be retrieved and a version identifier for the ETL code. For example, a file name or branch name may be included in the request along with a file path from which the file is to be retrieved. Although not illustrated, ETL job store 350 may retrieve a later version of the ETL code from version controlled code store 560, in some embodiments, if the version of the ETL code in ETL job store is not current with the latest version in version controlled code store.

Client 510 may send a request to update ETL code 550 to ETL job store 350, in some embodiments. The update request may include an identifier indicating the repository in which the ETL code is to be updated and a version identifier for the ETL code. For example, the file name or branch name may be included in the request along with a file path into which the updated version of the file is to be committed. Request 510 may include the updates or a pointer to a location where the updated ETL code is transferred to. ETL job store 350 may apply the update locally (e.g., store the new version ETL code) and send a request to commit the updated version of the ETL code 552 to version controlled code store 560.

Figure 6:
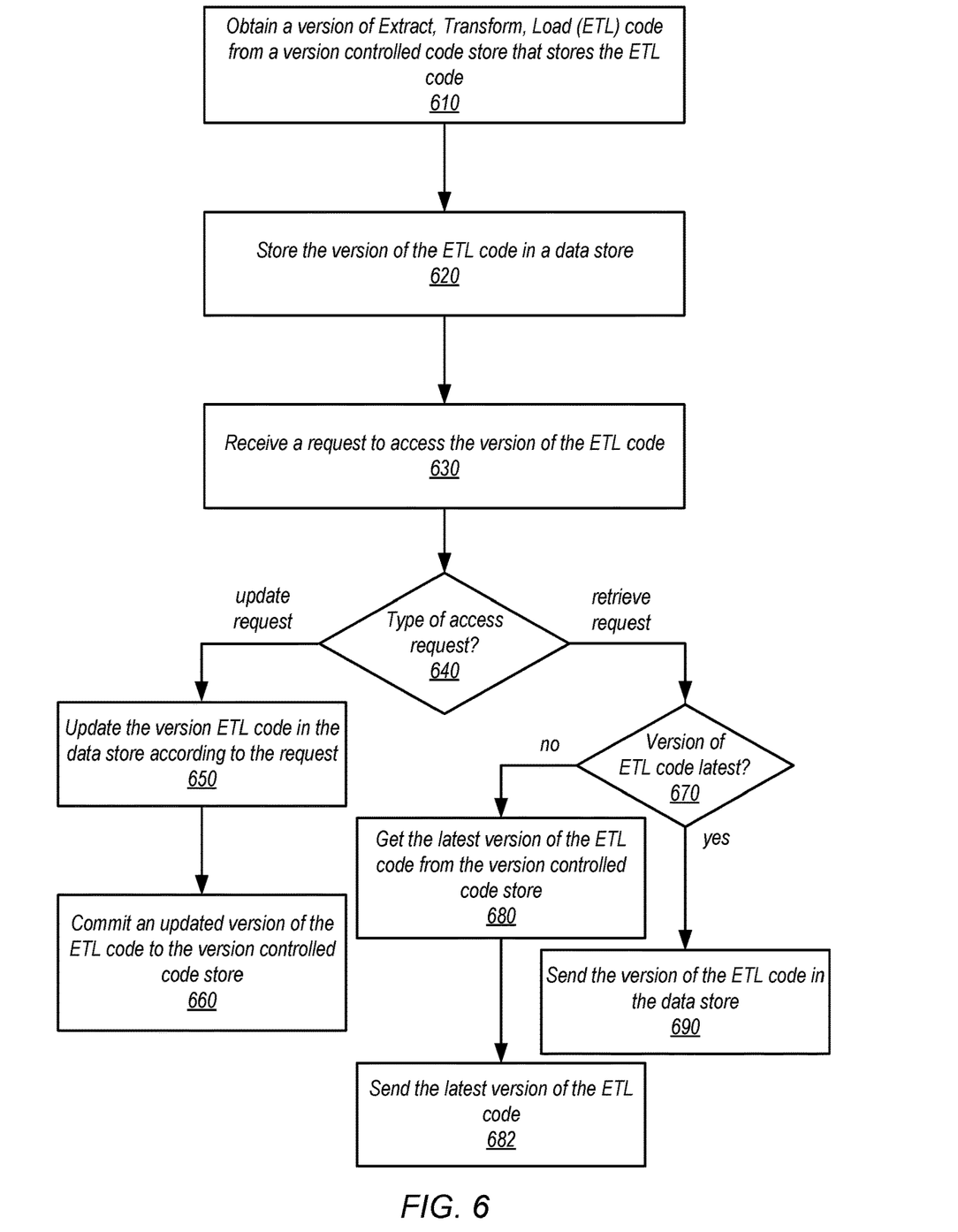
FIG. 6 is a high-level flowchart illustrating methods and techniques to implement event driven ETL processing, according to some embodiments.

Although FIGS. 2-5 have been described and illustrated in the context of an ETL service, the various techniques and components illustrated and described in FIGS. 2-5 may be easily applied to other data access or management systems in different embodiments that may facilitate ETL processing operations. Stand-alone ETL processing systems are an example of another embodiment that may be implemented in private networks or systems to perform similar techniques to those described above. As such, FIGS. 2-5 are not intended to be limiting as to other embodiments of a system that may implement hosting version controlled ETL code. FIG. 6 is a high-level flowchart illustrating methods and techniques to implement event driven ETL processing, according to some embodiments. Various different systems and devices may implement the various methods and techniques described below, either singly or working together. For example, an ETL service such as described above with regard to FIGS. 2-5 may be configured to implement the various methods. Alternatively, a combination of different systems and devices, such as a storage subsystem that manages access to data stored in directly attached storage devices may transform data using ETL code hosted according to the below techniques. Therefore, the above examples and or any other systems or devices referenced as performing the illustrated method, are not intended to be limiting as to other different components, modules, systems, or configurations of systems and devices.

As indicated at 610, a version of Extract, Transform, Load (ETL) code may be obtained from a version controlled code store that stores the ETL code, in various embodiments. ETL code may be source code, scripts, statements, functions, classes, objects, or other form of code that may be compiled, interpreted, or otherwise executed to perform an ETL job. An ETL job may transform one or more data objects from one data format (e.g., file type) or data schema (e.g., data structure, such as a number of columns, data value types, etc.) to generate transformed data object(s) in a target data format or data schema. The version of ETL code may execute all or a portion of the ETL job. For example, as discussed above with regard to FIG. 1B, different transformations performed as part of the ETL job may be separately maintained in a version controlled code store, allowing versions to be shared, updated, branched, or any other version control operations performed. In this way, developers may independently update, extend, or replace the transformations for ETL jobs for individual or communal purposes. Examples of ETL transformations may include, but are not limited to transformations to aggregate, combine, group, split, separate, rearrange, or restructure the location of data values (e.g., changing the mapping of data values to columns, combining values from fields into a single field, or relationalize or de-relationalize the form of data values), or transformations to delete, select, filter, modify, convert, or change the data values of a data object.

The version of the ETL code may be obtained from the version controlled code store in response to a request to add or provide access to a repository that maintains the version of the ETL code, in some embodiments, as discussed above with regard to FIG. 5. To obtain the version of the ETL code, a request may be sent to the version controlled code store, in some embodiments. For example, the request may be formatted according to a programmatic interface (e.g. API) or protocol for the version controlled code store that retrieves a repository.

Once obtained, the version of the ETL code may be stored in a data store, as indicated at 620, in various embodiments. The data store may be an object based data store, file system, or other persistent data store. In some embodiments, the data store may be a multi-tenant data store, such as code repository store 420 in FIG. 4, storing ETL code for multiple different clients while maintaining isolation between ETL code for different clients, so that unauthorized access to ETL code is prevented.

Once stored, the version of the ETL code may be maintained for servicing requests to access the version of the ETL code. For example, as indicated at 630, an access request may be received to access the version of the ETL code. The access request may be formatted according to an API or other protocol, such as is discussed above with regard to FIG. 5. Different types of access requests may be received, as indicated at 640. For example, an update request may be received that updates the version of the ETL code in the data store according to the request. For instance, the update request may include changes to the ETL code to be applied or may include a request to create a branch for a new version of the ETL code (including some changes). As indicated at 650, the version of the ETL code in the data store may be updated according to the request. The specified changes, for instance, may be applied to the version of the ETL code in the data store (e.g., changing text in the code at one or multiple locations). As indicated at 660, an updated version of the ETL code may be committed to the version controlled code store, in various embodiments. A request, for example, formatted according to the API for the version controlled code store may be sent to transfer the updated version from the data store to the version controlled code store.

For another type of request, such as a request to retrieve the version of the ETL code, a determination may be made as to whether the version of the ETL code is the latest version of the ETL code, as indicated at 670. For example, a version number or other identifier may be evaluated with respect to a version number or other identifier obtained from the version controlled code store. If the version number for the version of the ETL code in the data store is earlier than the version number obtained from the version controlled code store, then the version of the ETL code is not the latest version. If the version of the ETL code is not the latest version, then as indicated at 680, the latest version may be obtained from the version controlled code store (e.g., by sending a request formatted according to the API for the version controlled code store to get the ETL code). Then the latest version of the ETL code 682 may be sent. If the version of the ETL code in the data store is the latest version, then as indicated at 690, the version of the ETL code in the data store may be sent. The ETL code may be sent to local development environments (e.g., IDEs), hosted development environments (e.g., network-based code or text editors), or ETL code execution environments (e.g., an ETL code execution service or system like ETL job execution 340 in ETL service 220) as discussed above with regard to FIG. 4.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
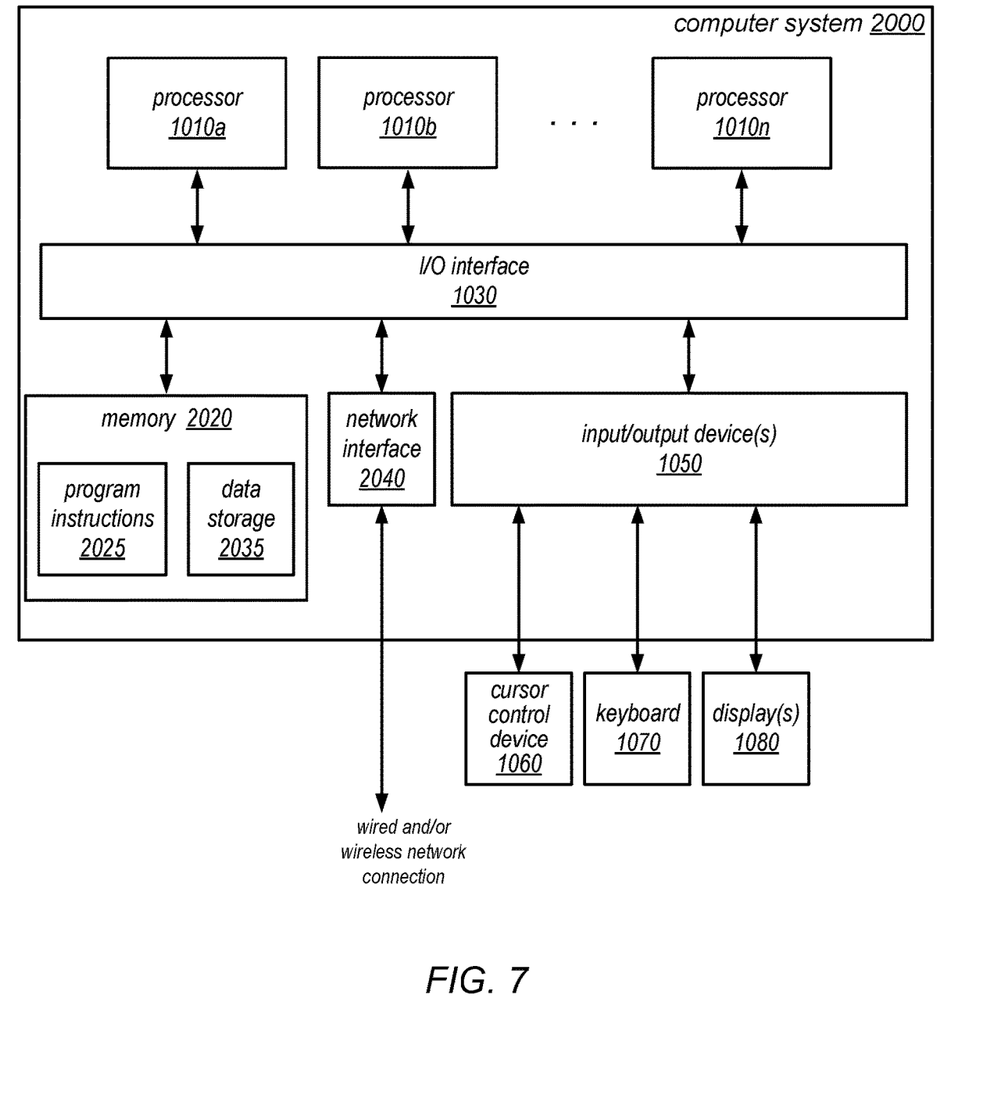
FIG. 7 illustrates an example system configured to implement the various methods, techniques, and systems described herein, according to some embodiments.

Embodiments of hosting version controlled ETL code as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
   at least one processor; and
   a memory to store program instructions that, if executed, cause the at least one processor to perform a method, comprising:

obtaining a version of Extract, Transform, Load (ETL) code comprising one or more transformations to be applied to a source data object from a version controlled code store;

storing the version of the ETL code in a code repository store;

receiving an access request to access the version of the ETL code; and in response to receiving the access request, accessing both the code repository store and the version controlled code store to perform the access request to the version of the ETL code in the code repository store according to a determined type of the access request.

2. The system of claim 1, wherein the method further comprises:

receiving a request to add access to the code repository at the version controlled code store that includes the ETL code, wherein the request includes one or more access credentials for the version controlled code store; and in response to receiving the request to add access to the code repository, sending a request to retrieve the code repository from the version controlled code store according to the one or more access credentials, wherein the ETL code is obtained from the code repository received from the version controlled code store.

3. The system of claim 1, wherein the access request is a request to update the version of the ETL code;

wherein accessing both the code repository store and the version controlled code store to perform the access request to the version of the ETL code in the code repository store according to the determined type of the access request comprises:

determining the type of the access request is an update request;

updating the ETL code in the code repository store according to the access request; and committing an updated version of the ETL code to the version controlled code store.

4. The system of claim 1, wherein the at least one processor and the memory are implemented as part of a network-based ETL service, wherein the access request is received via a programmatic interface for the network-based ETL service.

5. A method, comprising:

obtaining a version of Extract, Transform, Load (ETL) code comprising one or more transformations to be applied to a source data object from a version controlled code store;

storing the version of the ETL code in a code repository store;

receiving an access request to access the version of the ETL code; and in response to receiving the access request, accessing both the code repository store and the version controlled code store to perform the access request to the version of the ETL code in the code repository store according to a determined type of the access request.

6. The method of claim 5, further comprising:

receiving a request to add access to a code repository at the version controlled code store that includes the ETL code, wherein the request includes one or more access credentials for the version controlled code store; and in response to receiving the request to add access to the code repository, sending a request to retrieve the code repository from the version controlled code store according to the one or more access credentials, wherein the ETL code is obtained from the code repository received from the version controlled code store.

7. The method of claim 5, wherein the determined type of the access request is a request to update the version of the ETL code; and wherein accessing both the code repository store and the version controlled code store to perform the access request to the version of the ETL code comprises:

updating the version of the ETL code in the code repository according to the access request; and committing the updated version of the ETL code to the version controlled code store.

8. The method of claim 5, wherein the determined type of access request is a request to retrieve the version of the ETL code on behalf of a client; and wherein accessing both the code repository store and the version controlled code store to perform the access request to the version of the ETL code comprises:

determining that the version of the ETL code in the code repository store is not a latest version of the ETL code;

obtaining the latest version of the ETL code from the version controlled code store; and sending the latest version of the ETL code to the client.

9. The method of claim 8, wherein the client is a remote integrated development environment that displays the version of the ETL code.

10. The method of claim 8, wherein the client is an ETL execution engine, and wherein the method further comprises executing, by the ETL execution engine, the ETL code to apply the transformations to the source data object to generate one or more transformed data objects.

11. The method of claim 5, further comprising:

receiving a request to create a code repository at the version controlled code store, wherein the request includes one or more access credentials for the version controlled code store; and in response to receiving the request to create the code repository, sending another request to create the code repository to the version controlled code store according to the one or more access credentials.

12. The method of claim 11, further comprising:

receiving different ETL code to store in the code repository;

storing the different ETL code in the code repository store; and sending a request to commit the different ETL code to the code repository.

13. The method of claim 5, wherein the obtaining, the storing, the receiving, and the accessing are performed by a network-based ETL service, wherein the access request is received via a programmatic interface for the network-based ETL service.

14. A non-transitory, computer-readable storage medium, storing program instructions that when executed by one or more computing devices cause the one or more computing devices to implement:

obtaining a version of Extract, Transform, Load (ETL) code comprising one or more transformations to be applied to a source data object from a version controlled code store;

storing the version of the ETL code in a code repository store;

receiving an access request to access the version of the ETL code; and in response to receiving the access request, accessing both the code repository store and the version controlled code store to perform the access request to the version of the ETL code according to a determined type of the access request.

15. The non-transitory, computer-readable storage medium of claim 14, wherein the ETL code is one transformation of a plurality of transformations executed as part of an ETL job.

16. The non-transitory, computer-readable storage medium of claim 15, wherein the program instructions cause the one or more computing devices to further implement:

receiving different ETL code to store in the code repository;

storing the different ETL code in the code repository store; and sending a request to commit the different ETL code to the code repository.

17. The non-transitory, computer-readable storage medium of claim 14, wherein the determined type of the access request is a request to update the version of the ETL code; and wherein, in accessing both the code repository store and the version controlled code store to perform the access request to the version of the ETL, the program instructions cause the one or more computing devices to implement:

updating the version of the ETL code in the code repository store according to the access request; and committing the updated version of the ETL code to the version controlled code store.

18. The non-transitory, computer-readable storage medium of claim 14, wherein the determined type of access request is a request to retrieve the version of the ETL code on behalf of a client; and wherein in accessing both the code repository store and the version controlled code store to perform the access request to the version of the ETL the program instructions cause the one or more computing devices to implement:

determining that the version of the ETL code in the code repository store is not a latest version of the ETL code;

obtaining the latest version of the ETL code from the version controlled code store; and sending the latest version of the ETL code to the client.

19. The non-transitory, computer-readable storage medium of claim 18, wherein the client is a graphical user interface hosted at a network-based site, and wherein the program instructions cause the one or more computing devices to further implement displaying the version of the ETL code via the graphical user interface.

20. The non-transitory, computer-readable storage medium of claim 14, wherein the one or more computing devices are implemented as part of a ETL service offered by a provider network, wherein the access request is received via a programmatic interface for the ETL service, wherein the version controlled code stored is implemented as part of a code repository service, and wherein obtaining the ETL code is performed according to a programmatic interface for the code repository service.

* * * * *